(12) United States Patent
Sharma

(10) Patent No.: US 10,192,048 B2
(45) Date of Patent: Jan. 29, 2019

(54) CERTISAFE, A NOVEL CREDENTIAL AUTHENTICATION PROCESS AND SYSTEM ( CAPS )

(71) Applicant: Certisafe Private Limited, New Delhi (IN)

(72) Inventor: Smita Sharma, New Delhi (IN)

(73) Assignee: CertiSafe Private Limited, New Delhi (IN)

( * ) Notice: Subject to any disclaimer, the term of this patent is extended or adjusted under 35 U.S.C. 154(b) by 0 days.

(21) Appl. No.: 14/349,363

(22) PCT Filed: Oct. 1, 2012

(86) PCT No.: PCT/IN2012/000657
§ 371 (c)(1),
(2) Date: Apr. 3, 2014

(87) PCT Pub. No.: WO2013/051033
PCT Pub. Date: Apr. 11, 2013

(65) Prior Publication Data
US 2015/0074757 A1    Mar. 12, 2015

(30) Foreign Application Priority Data

Oct. 3, 2011 (IN) .......................... 2863/CHE/2011

(51) Int. Cl.
*G06F 21/31*   (2013.01)
*G06F 21/45*   (2013.01)

(52) U.S. Cl.
CPC .................................. *G06F 21/45* (2013.01)

(58) Field of Classification Search
None
See application file for complete search history.

(56) References Cited

U.S. PATENT DOCUMENTS

2002/0012133 A1* 1/2002 Haruna .................. G06Q 20/02
358/1.15
2007/0250920 A1* 10/2007 Lindsay .................. G06F 21/31
726/7

(Continued)

OTHER PUBLICATIONS

An Implementer's Guide to the Identity Selector Interoperability Profile V1.0, Apr. 2007; Microsoft Corp.*

(Continued)

*Primary Examiner* — Lynn D Feild
*Assistant Examiner* — Richard A McCoy
(74) *Attorney, Agent, or Firm* — Jay R. Yablon

(57) ABSTRACT

Certisafe is a novel Credential Authentication Process and System (CAPS), where a CertiSafe ID is generated once and only once the Issuer confirms the Authenticity of the Credential of a Candidate. This CertiSafe ID is a unique electronic ID, unique to the Candidate and also unique to the unique Credential, can be used repeatedly and endlessly in lieu of paper based copies that a Candidate usually submits to the Requestor through an application (physical/electronic). This method also purports to save precious paper and time for candidates each time they have to apply to an institution or an organization, by making redundant completely, the requirement of paper copies of the credentials and also their subsequent attestation. The verified credential, through CertiSafe ID, gives the Requesting organization the confidence of absorbing the right candidate and not a candidate with dubious credentials.

1 Claim, 4 Drawing Sheets

(56) References Cited

U.S. PATENT DOCUMENTS

| | | | | |
|---|---|---|---|---|
| 2008/0028220 A1* | 1/2008 | Wyssen | ............... | G07D 7/20 |
| | | | | 713/176 |
| 2009/0204542 A1* | 8/2009 | Doman | ............... | G06F 21/33 |
| | | | | 705/50 |
| 2009/0204622 A1* | 8/2009 | Sanders | ............ | G06Q 20/341 |
| 2009/0205035 A1* | 8/2009 | Sermersheim | ......... | G06F 21/34 |
| | | | | 726/9 |
| 2010/0187302 A1* | 7/2010 | Sermersheim | ......... | G06F 21/33 |
| | | | | 235/380 |
| 2012/0084434 A1* | 4/2012 | Shaw | ............... | G06F 19/324 |
| | | | | 709/224 |

OTHER PUBLICATIONS

Identity Selector Interoperability Profile V1.0 , Apr. 2007, Arun Nanda, Microsoft Corp.*

T. El Maliki et al., A Survey of User-centric Identity Management Technologies, Emerging Security Information, Systems, and Technologies, Emerging Security Information, Systems, and Technologies, 2007. SecureWare 2007. The International Conference on Emerging Security Information, Systems and Technologies, IEEE (2007), pp. 12-17.

World Intellectual Property Organization (WIPO), WIPO Digital Access Service for Priority Documents (DAS), PCT Newsletter, No. 01/2010, http://www.wipo.int/edocs/pctndocs/en/2010/pct_news_2010_01.pdf (Jan. 2010), pp. 3-5.

* cited by examiner

| # | Year | Education | School/College | Board/University | Marks |
|---|---|---|---|---|---|
| 1 | 2004 | Class - X$^{th}$ | ABC School, Chennai | C.B.S.E. | 86% |
| 2 | 2006 | Class - XII$^{th}$ | DEF School, Mumbai | C.B.S.E. | 92% |
| 3 | 2009 | B.Sc. (H) Physics | ABC College, Delhi | Delhi University | 82% |
| 4 | 2011 | M.Sc. Physics | DEF College, Kolkata | University of Calcutta | 85% |

Figure 1

| # | CertiSafe ID | Year | Education | School/College | Board/University | Marks |
|---|---|---|---|---|---|---|
| 1 | ABCD1234 | 2004 | Class - X$^{th}$ | ABC School, Chennai | C.B.S.E. | 86% |
| 2 | ABCD2468 | 2006 | Class - XII$^{th}$ | DEF School, Mumbai | C.B.S.E. | 93% |
| 3 | ABCD3579 | 2009 | B.Sc. (H) Physics | ABC College, Delhi | Delhi University | 82% |
| 4 | ABCD9999 | 2011 | M.Sc. Physics | DEF College, Kolkata | University of Calcutta | 85% |

Figure 2

CERTISAFE, A NOVEL CREDENTIAL AUTHENTICATION PROCESS AND SYSTEM (CAPS)

FIELD OF INVENTION

CertiSafe is a process of generating a reusable, unique, electronic authentication ID for a Credential by the beholder in lieu of submission of paper based copies, attested or otherwise, where this unique CertiSafe ID is generated once and only once the Credential is authenticated by the source, i.e. the Issuer.

CertiSafe pertains to a process of avoiding fake credentials (known as copies) and also the reproduction of genuine credentials (also known as copies), both of which are unnecessary.

It is a method to maintain an online electronic repository of the Credentials of its users, i.e. 'Candidates'.

It is intended to provide convenience, in a secure manner, to all its actors viz. Candidates, Issuers and Requestors.

BACKGROUND OF INVENTION WITH REGARD TO THE DRAWBACK ASSOCIATED WITH KNOWN ART

This invention is intended to give the institutions a simple and secure way to identify the fake credentials without much effort, since each institution could be in a position to see the authentication status of each credential. Based on this, an informed decision could be taken by the institution, without leaving anything to chance.

This invention is also intended to replace the current practices of attaching paper copies of credentials as proofs achievements as and when a candidate applies to an institution. This institution may be academic or research based or professional or employment based or a government body or a non-government body etc.

These credentials serve their purpose in due diligence, but also:
- Use huge amounts of paper to make these credential copies
- Occupy huge spaces in storage cabinets that are then discarded after a few years
- Maintaining the stored credentials itself becomes a challenging task and retrieving large voluminous files is also a challenge in itself.
- Potential to become a security nuisance since the discarded copies have misuse potential.

Other than this humungous amount of wastage of paper, there is also a large wastage of time. The candidate has to get a copy made, get it attested at times by someone credible, and then post/courier these copies.

Further, CertiSafe system intends to make redundant the practice of getting these paper copies 'attested' or validated by the issuing institution and/or through a specified set of officials (government or non-government) or public notaries.

CertiSafe also makes redundant the practice of self-attestation, which is not valid in any case and a practice that has risen from the 'innocent unless proven guilty' philosophy, since a person intent on committing a fraud through fake credentials would not have the morality levels that make him stop to self-attest.

Issues seen with the current Credential authentication practice are detailed in Annexure-1.

OBJECT OF INVENTION

The principal object of the invention is the 'CertiSafe' program. This program enables the 'Requestor' to seek the authentication status of the credentials provided by a 'Candidate', that have been issued by an 'Issuer'. The entire process is governed by the workflow based CertiSafe system that binds all these roles together.

Another object of the invention is the reusable, unique, electronic authentication ID known as the CertiSafe ID, which is issued for each unique Credential, once and only once the Credential is authenticated by the Issuer and is thus bonafide of the Candidate. The Candidates and Requestors can use this CertiSafe IDs repeatedly for multiple institutions, in lieu of paper based copies (attested or not). This is explained through FIGS. 1 and 2.

Additional object of this invention is the creation of an electronic repository of Credentials of the users, viz. the Candidates.

A further object of this invention is the underlying principle for CertiSafe, viz. the Identity Lifecycle Management (I L M).

STATEMENT OF INVENTION

CertiSafe is a novel Credential Authentication Process and System (CAPS) that aims to make redundant the need of attaching copies of Credentials (including attested and/or validated) by a Candidate when applying to an institution. This is done bye seeking authentication from the source of the Credential itself, viz. The Issuer, who alone has the recorded information on the issuance of the Credential. This in turn also ensures that the opportunity of a fake credential being used by a Candidate becomes infinitesimal. It also ensures that the Identity Lifecycle Management is secured for a Candidate by being managed personally by the Candidate itself (ILM).

BRIEF DESCRIPTION OF THE DRAWINGS

The features of the invention believed to be novel are set forth in the appended claims. The invention, however, together with further objects and advantages thereof, may best be understood by reference to the following description taken in conjunction with the accompanying drawing(s) summarized below.

FIG. 1 is a table illustrating an abridged sample application form, without CertiSafe ID.

FIG. 2 is a table illustrating an abridged sample application form, with CertiSafe ID.

A SUMMARY OF INVENTION

Figure 3:
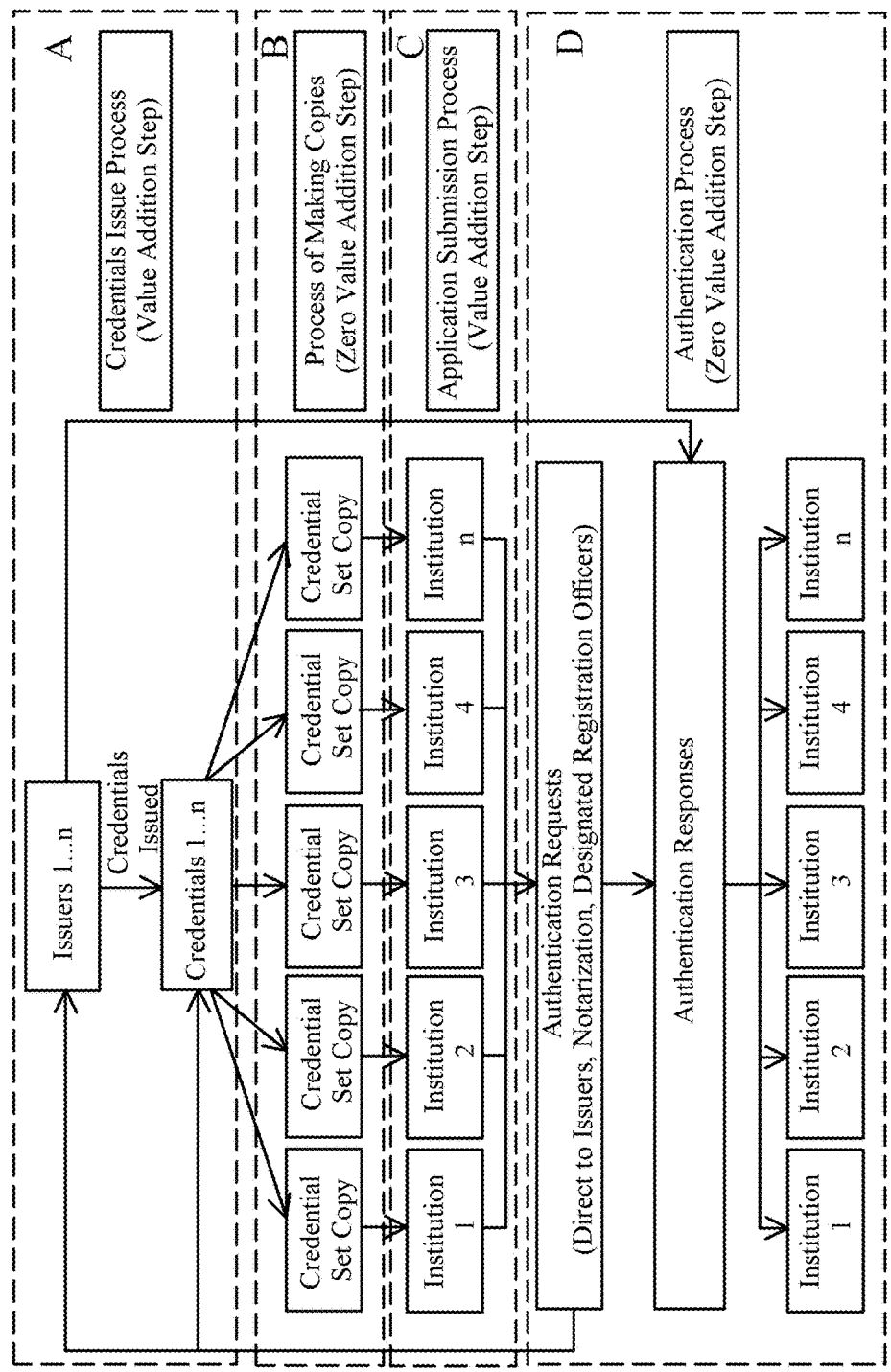
FIG. 3 is a block diagram illustrating a graphical representation of the credential usage practice currently.

Disclosed herein is an electronic credential authentication system and related method and electronic repository for authenticating a credential, at the request of a requestor who wishes to obtain a status of the credential as reported by an issuer of the credential in relation to a candidate claiming to possess the credential, using a user interface, computerized processing, and non-transient computerized storage, the system comprising: the computerized storage comprising an electronic repository comprising a plurality of credential entries, each credential entry comprising: a) a present status of the credential, b) other details of the credential, c) identifying information associating the candidate with the credential, d) identifying information associating the credential with the issuer and e) a unique "CertiSafe" ID associated with the credential, which the "CertiSafe" ID is generated only once the credential has been duly authenticated as bona fide by the issuer; the user interface enabling the issuer to electronically confirm the authenticity of a claimed credential to the system; in response thereto, the computerized processing causing the associated credential entry to include in its present status, the confirmation of authenticity by the issuer; the user interface enabling the requestor to provide the unique "CertiSafe" ID to the system; and in response thereto, the system providing the present status of the credential from the electronic repository to the requestor; wherein: the credential entries in the electronic repository comprise any kind of credential that may be issued by any kind of credential issuer.

CertiSafe is a novel Credential Authentication Process and System (CAPS) where in an electronic repository is created by the Candidates for themselves.

Each of the credentials mentioned is then requested for authentication through a workflow to the institution that has issued the credential.

Once and only once the Issuer authenticates the said credential, a unique CertiSafe ID is generated.

The candidates could thus use this CertiSafe ID in the application form (physical or electronic) in lieu of attaching attested/verified copies of the credentials along with the application to an institution. An example is shown in FIGS. 1 & 2.

The Candidate has to compulsorily attach copies of credentials, attested/authenticated or otherwise. Most of the times, the Candidate has to also show the credential in original to the Institution being applied to, even after the attestation has been obtained from an officer with attestation authority or a public notary.

Once the Candidate has the CertiSafe ID generated for the Credentials, the Candidate has to simply mention the CertiSafe ID in the application form as shown above. The need for copies of Credentials, attested/authenticated or otherwise, thus becomes completely redundant.

CertiSafe is a novel method that can also safe keep the credentials of individuals. This has been explained in detail in Section 8.1.4.3.2.4.

Requestors can then easily seek the authentication status of the candidate's credentials by logging on to the CertiSafe System through their registered account.

CertiSafe thus provides its users the ability to effectively and securely manage their Identities through its entire lifecycle (Identity Lifecycle Management).

Graphical Presentation of CertiSafe

The current practice of Credential usage by the Candidates for myriad purposes is shown in FIG. 3.

As can be seen that the current practice follows the 4 main steps

Step A: A Credential is issued by the Issuer to a Candidate.

Step B: The Candidate then creates multiple sets of copies of all Credentials to advocate suitability to the Institution of choice.

Step C: Candidate then sends the requisite application(s) with the copies of all required Credential(s) to the Institution(s).

Step D: This is the authentication step, where the Institution (viz. Requestor) may ask the Candidate or the Issuer for confirmation on the authenticity of the credential. This step arises mostly when there is a doubt on the credibility of the Credential or there is a clash for the same position between multiple candidates or when it is a policy at the institution where the application has been given by the Candidate.

The rest of the applications with all their credentials are deemed to true, based on trust and faith. Trust, that the applicant would not jeopardize selection/processing of application and Faith, that the previous Candidates have been true (or haven't got caught with fraud anywhere on these credentials).

Currently, this authentication is usually done in the following ways:

Attestation: The Original Credential is presented to an Attesting Officer who would compare the Copy of the same Credential. Once satisfied, the Attesting Officer then signs the Credential copy and also affixes a seal or stamp that signifies his/her attestation authority. This is by far the most common practice owing to its convenience.

The drawbacks of this, however, are detailed in Annexure-I.

Notarization: Notarization is similar to the Officer Based Attestation; the only difference being the person attesting is a notified Public Notary. This is also a common practice, but not as popular as compared to Officer based attestation discussed above.

The drawbacks of this are also detailed in Annexure-I.

Validation: A copy of the Credential is sent to the issuing institution Issuer) to validate the same. Though this is the correct way, but being time consuming and laborious, it is seldom done. Even if it is done, it is the application receiving institution who sends out the request mostly.

Drawbacks and hindrances of this are also detailed in Annexure-I.

CertiSafe: This inventive step, is able to circumvent the above hindrances in a novel manner. The workflow for CertiSafe is given in FIG. 4.

Figure 4:
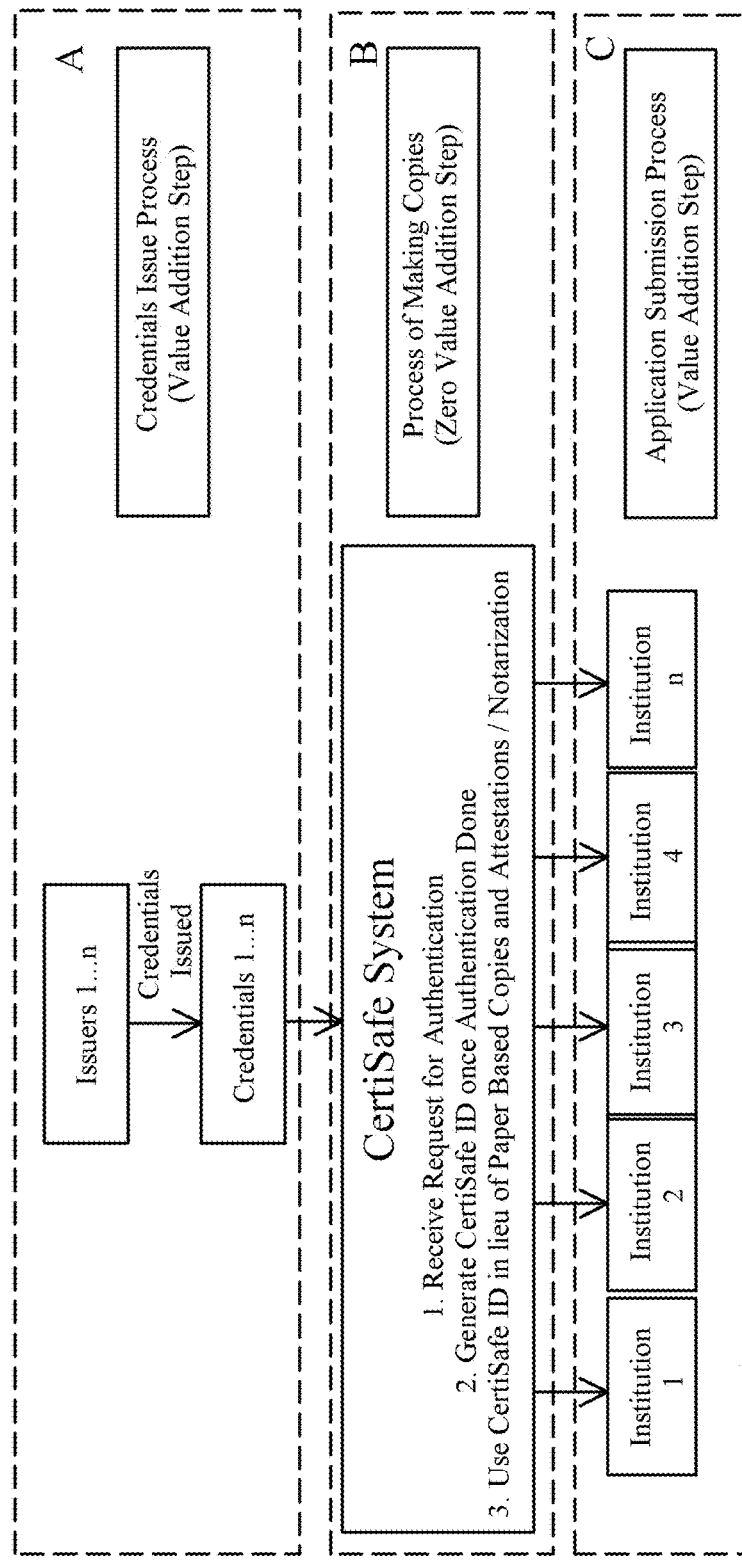
FIG. 4 is a block diagram illustrating a CertiSafe graphical presentation.

It can be seen from the FIG. 4, that CertiSafe
  completely eliminates Step D (attestation/validation).
  replaces the Step B, thus eliminating the need for creating multiple sets of copies of all credentials.

DETAILED DESCRIPTION OF THE INVENTION WITH REFERENCE TO DRAWING/EXAMPLES

CertiSafe is a convenient and online system comprising of (but not limited to these alone): Actors, Objects, CertiSafe System and CertiSafe Touch Points, CertiSafe Links. These have been detailed below:

Identity Lifecycle management (I L M): Credentials chisel an individual's identity. It is imperative to not only grow one's credentials, but also to secure them. I L M is simply the straight line, time based milestone achievement that each of us goes through in the overall universe of equally abled and qualified individuals. The concept is two pronged:

Securing the Identity: Through CertiSafe, Candidates would for the first time, get the ability to secure their identity. This is to thwart any attempt to create a fake Credential on the basis of a genuine one of a genuine individual (Candidate) or to even usurp the whole identity of a genuine individual (Candidate) as such.

This is so much truly applicable to institutions as well whose equity is used by unscrupulous elements by targeting individuals (Candidates) of the renowned institutions (Issuers).

Relational Identity: CertiSafe would enable an individual to place oneself vis-à-vis the peer group in the whole universe (of CertiSafe Candidates). This placement would enable the Candidates to:

Help chart the future course of action.

Make mid-course corrections on the steps already taken towards a brighter future.

Understand the associated areas/additional qualifications of the peer group and/or the aspirational peer group.

This would help the institutions (Issuers) too since they would get to fine tune the academics/curriculum based on the changing user (Candidates') preferences.

Actors: Any CertiSafe user can obtain either or all of the roles mentioned below, though it is recommended that users create multiple accounts for each role.

Candidates: who would enroll as a user, with Candidate work area as the choice and system defined associated responsibilities and privileges on the CertiSafe system. The candidate could be an individual or an organization, who would wish to have their credentials:

Authenticated or Validated by Issuer and/or CertiSafe.

Kept in safe custody by CertiSafe.

Be made available online to requestors, irrespective of the authentication status.

Some of the key features available to Candidates are (but not limited to these alone):

Privacy Lock: Since Credentials are a key to an individual's identity, Candidates will have the option to show or hide their identity (and the credentials) to the specified users.

Deferred Payment: Candidates would own the CertiSafe ID as a service and hence would be expected to pay nominal charges for the same that would be based on multiple parameters. One of the parameters would be belonging to the economically weaker section of the society. Such candidates, based on the parameters set and met, could continue enjoying their CertiSafe ID without any or by paying partly for a specified time period.

Issuers: who would enroll as a user, with Issuer work area as the choice and system defined associated responsibilities and privileges, and has issued any kind of credential and is also registered as a user of the CertiSafe system, for example (but not limited to):

Educational Bodies like schools, colleges, universities etc.

Commercially oriented organizations like PSUs, private companies etc.

Government agencies/departments/units etc.

Non-Government Organizations etc.

Profit based/Non-profit based organizations

Standards certifying bodies etc.

Individuals

Requestor: who would enroll as a user, with Requestor work area as the choice and system defined associated responsibilities and privileges, and who would want to know the authenticity of the claim (s) made by the candidate through his/her/their credentials. Just like the Issuers, Requestors could be any of the following (but not limited to these only):

Educational Bodies like schools, colleges, universities etc.

Commercially oriented organizations like PSUs, private companies etc.

Government agencies/departments/units etc.

Non-Government Organizations etc.

Profit based/Non-profit based organizations

Standards certifying bodies etc.

Individuals

Object: is the credential that the Candidate claims to have been given by the Issuer.

These credentials may itself be in any form—paper based or electronic.

These credentials would be uploaded by the Candidate under his/her/their work area. The user would:

Use a template, if available, to fill details of the credentials that enable the Issuer to authenticate the credential with ease and without any doubt.

Convert the credential into electronic format by scanning and then upload the same to the CertiSafe system. This is an optional step for the Candidate.

The credentials include documents known as certificates, but not limited to them only. These credentials may be in the form of (but not limited to only these):

Academic Achievements like (but not limited to):

A Birth Certificate

A Marriage Certificate

A Degree (Bachelors, Masters, M. Phil, Doctorates etc)

A Diploma

A Scholarship Certificate

Certificate of Merit

A Marks Sheet

Semester End Reports

Transcripts

Certificates in performing arts that have been issued by an institution (Arts/Academic/Government/Non-Government, etc.).

Certificates in sports that have been issued by an institution (Sports/Academic/Government/Non-Government, etc.).

Professional accomplishments that may have been issued by an institution Commercial/Testing/Government/Non-Government, etc.).

Identification based credential like (but not limited to):

A driving license

A passport

An Identity Card, issued by an academic/professional/government/non-government body etc.

Credentials of physical handicap or disability

Credentials of belonging to a specified social strata with privileges like reservation, priority etc.

Credentials of Accomplishments etc.

Ownership credentials of a moveable/immovable property

Employment credentials

References

Figure 5:
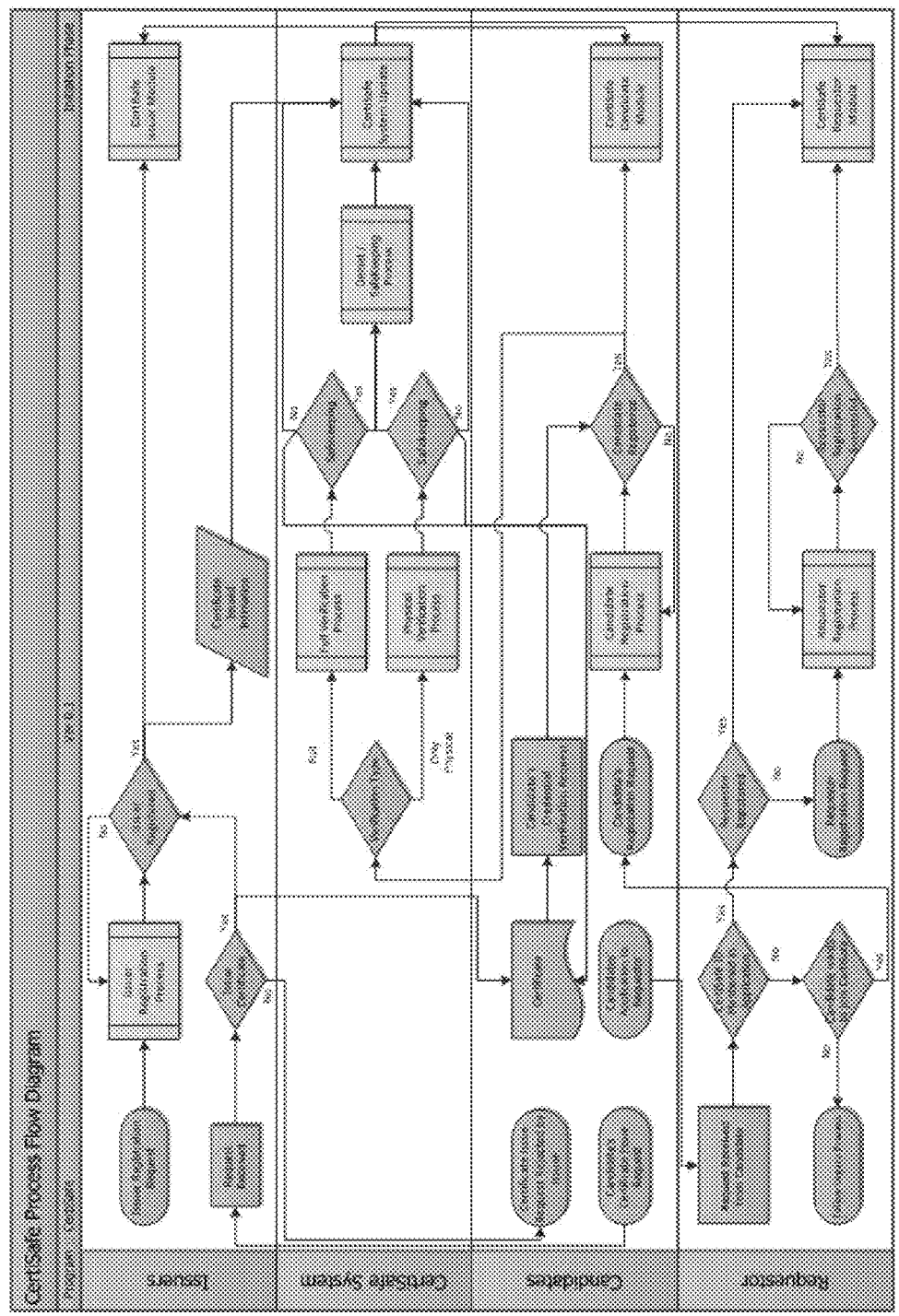
FIG. 5 is a block diagram illustrating a CertiSafe process flow.

CertiSafe System: CertiSafe System is the common ground the Actors (Candidates, Issuers and Requestors) would meet and perform the workflow based, desired actions on the Object (Credentials). The Process Flow Diagram explaining CertiSafe is illustrated in FIG. 5 which shows a computer system with the following functions:

Primary Functions
- Provides login based secure access to all Actors. A unique ID would be provided to each user.
- Provides work area and associated privileges and responsibilities to each user type.
- Provides requisite workflows based on the requests raised and actions taken by users.

User Based Functions
- Membership Request Module where users can select the type of role and privileges they wish to have in the CertiSafe System.
- Authentication Request module where users can request for different types of authentication available.
- Reports Module on parameters associated with a credential or a candidate or an institution or a requestor.
- Act On Behalf Module where an Issuer or requestor can request CertiSafe to perform certain actions on their behalf.
- SafeKeep Module where candidates can request CertiSafe to safe keep their credentials at CertiSafe Touch Points. Here the candidate can deposit the Credential with CertiSafe and also has the option of retrieving it.
- Search Module, which will be a parameter based search.
- Help Module to help guide each user role to perform the expected actions.

Credential Authentication:
- Full Authentication: This process assures and ensures that:
  - Physical Authentication has been done, signifying the possession of the credential with the Candidate. This process has been detailed in Section 8.1.4.3.2.
  - Online Authentication has also been completed for the credential, signifying that the credential was found to have genuinely been issued by the said Issuer. This process has been detailed in Section 8.1.4.3.3.
- Physical Authentication Only: Purpose of this step is to ensure that the Credential has been verified to be present in physical form with the Candidate at the time of authentication.
  - This is not a mandatory step in the CertiSafe system or to get a CertiSafe ID.
  - This step can be done after the online verification also, meaning that there is no specific order to be followed to get the Full Authentication tag attached to a credential.
  - This step can be carried out at the CertiSafe Touch Points, since it involves the physical credential.
  - Candidates have the option to Safe Keep the credential with CertiSafe and also the option to retrieve the same.
    - If Safe Keeping is chosen for a credential, the same would not be given back to the Candidate upon Physical Authentication and vice versa.
  - In this process, the said credential undergoes the following steps but not limited to these alone)
    - Candidate's ID is opened.
    - Credential is Scanned.
    - Scanned image is them uploaded in the CertiSafe system under the Candidate's ID.
    - A CertiSafe ID is generated for the said credential.
    - This ID is automatically tagged to the Candidate's ID.
- Online Authentication Only: This step is initiated only once the same has been requested by the Candidate through CertiSafe Touch Points or through the online CertiSafe System.
  - Online Authentication involves the following steps (but not limited to these alone)
    - Scanned image is uploaded by the Candidate or by the CertiSafe Touch Point under the Candidate's ID.
    - A CertiSafe ID is generated for the said credential.
    - This ID is automatically tagged to the Candidate's ID.
    - Check is made on the status of the participating institution.
    - If the said institution is also a registered user as an Issuer, the request for authentication is sent to the Issuer as per the communication link option chosen by the Issuer at the time of registration.
    - The institution then authenticates the requested credential based on the said institution's internal processes.
    - A CertiSafe ID is then issued to the Credential. Candidate can use this CertiSafe ID going forward with the Institutions who accept the CertiSafe ID as the only form of true authentication.
    - If the said institution is not a registered user as an Issuer, the Candidate is notified and in parallel, a request sent to the institution (if the contact details are available) to register at the CertiSafe System.
    - Once the previously unregistered institution registers on the CertiSafe System, it can authenticate the request from the Candidate.
    - A CertiSafe ID is then issued to the Credential. Candidate can use this CertiSafe ID going forward with the Institutions who accept the CertiSafe ID as the only form of true authentication.

CertiSafe Touch Points: These are the physical centers that act as the touch points to the Actors. This is to facilitate the users who do not have access to internet or require technical support to derive benefits out of the CertiSafe system. Some of the functions of the CertiSafe Touch Points are mentioned below (but are not limited to these):
- Candidate Registration: Help candidates register on the CertiSafe System.
  - Candidates who have registered online also have the option to avail of all services at the CertiSafe center
- Safe Keeping: Requesting the CertiSafe System to Safe Keep the Credential.
- Credential Retrieval: Requesting the CertiSafe System to retrieve the Safe Kept Credential and hand over the same to the Candidate.
- Self Service Kiosks: Perform the user based functions at a self-service terminal provided for this purpose at the CertiSafe Touch Point.

CertiSafe Links: This section details the indicative linkages that the CertiSafe system Would have with its different user types, viz. Candidates, Issuers and Requestors.

However, these linkages are not limited to only these user groups and are set to include other Actors that would be added in the future.

Also, the links mentioned below are also not the limited links and additional linkage options would be added to the CertiSafe system in the future.

The indicative linkages are described below:

Candidate linkages: Candidates would be provided ample possibilities to link up with CertiSafe System. Some of them are given below (but not limited to these alone):

Web Browser Based Link Up: Enabling Candidates to access their account through popular web browsers like Internet Explorer, Chrome, Mozilla etc.

Mobile Phone Link Up: Here the Candidates could use the mobile phone browser like Opera Mini, Android, BlackBerry etc to access their account.

App Link Up: Users could download an App that they would be then required to install in their desktop or laptop or mobile phone or a tablet pc etc.

Issuer Linkages:

Browsing Linkages: Issuers, just like Candidates would be provided multiple linkage options through Web Browsers, Mobile Phones as well as through Apps that they can download and install at a device of their choice.

Authentication Data Linkage: Issuers, as per their role, would have the responsibility to authenticate a request from a Candidate. For this, they would be provided with the following options (but not limited to these alone):

Synchronous Mode Data Link for Authentication: These are of further three types:

Direct Authentication: Here the Issuers would be provided a direct secure link (like exchanging xml based messages) to make real time authentications without any human intervention. In this mode, the CertiSafe System would send out a request, through a secure link, to the Issuer's IT System. Based on the data available with the Issuer, if all specified parameters are found to be correct, the authentication would be completed and a CertiSafe ID issued.

Loaded Data Authentication: Here the Issuers get the option to upload their electronic database on the credentials issued on to the CertiSafe system. This loaded data would be utilized in two ways:

Instant Authentication: If this mode is selected by the Issuer for authenticating credentials issued by them, then as and when a request from the Candidate is received, it would result in instant verification.

Issuer Guided Authentication: In this mode, the Issuer has the option to authenticate the credential either through its own records available (at the issuing institution) offline or through the database that is already loaded on to the CertiSafe system by the Issuer.

Historical Data Authentication: This mode would be utilized by the Issuer just like Issuer Guided Authentication as explained in Section 8.1.6.3.2.2.1.2.2, with the only difference being non-availability of any electronic record of these Credentials in the CertiSafe System, since they were never, loaded in the CertiSafe System, since they were not available in electronic database form with the Issuer.

Asynchronous Mode Data Link for Authentication: In this mode, the Issuers have the option to send across their electronic database to the CertiSafe System through data storage devices like CD/DVD/removable drives etc. Once received, the entire data will be uploaded onto the CertiSafe System by CertiSafe team. Post this, the Issuers can follow the Loaded Data Authentication process as explained in Section 8.1.6.3.2.2.1.2.

Offline Mode for Authentication: This mode enables even those Issuers who do not have access to computers and maintain their Credential records completely on paper or are unwilling to perform an electronic authentication. In this mode, the following steps would be undertaken (but not limited to these only):

Send authentication request to the Issuer through regular post/mail.

Receive the authentication response from the Issuer.

Scan the response from the Issuer and upload it under the Candidate's Credential's CertiSafe ID.

If the authentication response is positive, mark the Credential as Authentication Confirmed and generate the CertiSafe ID.

If the authentication response is negative, mark the Credential as Authentication Rejected and cancel the CertiSafe ID.

Requestor Linkages: The Requestor would primarily have just the Browsing linkage, similar to Candidates and Issuers. The Requestors would be in a position to access the CertiSafe system through Web Browsers, Mobile Phones as well as through Apps that they can download and install at a device of their choice.

ANNEXURE-I

Problems with Current Verification Process

The moment a child is born, jostling for an identity begins and starts with a Name (Given Name that adds to the Family Name).

Identity, that is unique for everyone. But is it really unique?

Identity is not what one makes out of oneself, but how and with which others relate that individual to. It is this relative relation that others value.

But, this 'Identity Management' is just one face of the coin. The other face is the authenticity of this relative value, value that is created through the entire lifecycle of these identities.

So, the moment a baby is born, there is a sequence that gets triggered.

The rush to get the birth certificate.

The birth certificate leads to school admissions.

School admission leads to academic qualifications

Academic qualifications lead to employment opportunities.

Employment lead to financial opportunities.

Financial opportunities lead to wealth and prosperity and false ego.

So, if one rides back the above scenario, in the zest to be one up in a world of equals, a weak character is bound to fall prey.

Also, unfortunately, each of these milestones is a vulnerability point as well. The level of verification done is futile owing to the large populace and lack of implementation of processes, if any. If only that one fake credential was nipped in the bud.

Innumerable number of times, one is asked to provide copies of his/her credentials. Be it an application for an academic admission, a passport, a visa, a home loan, legal service, credit card, driving license or just about anything.

Unfortunately, receiving an application is beginning of dilemma for the 'giver' organization as well!!

How do I check the qualification of this application?
Common solution: Get copies of the credentials.
How do I check the authenticity of the credentials?
Common solution: Get the originals.
How do u check if originals are real and not manipulated?
No real solution!!

Every organization hits this dead end and bases its acceptance of an application on trust and faith.

Trust that the candidate applying would not risk submitting false credentials.

Faith, that all previous candidates have been truthful.

An attempt is then made to give a cloak of assurance to the same trust and faith, by undertaking some generic checks. But these checks that are carried out, have issues that go unanswered:

Attestation:
Who verifies the attestation authority of the attesting authority?
Is the attesting office trained to differentiate between an original and a good fake?
Notarization:
How did the notary verify?
Who verifies the notary?
Are notaries trained to differentiate an original from a good fake?
Verification with originals:
Does looking at an original ensure authenticity?
Even for credentials of institutes that the verifier has never heard of?
Is the verifier trained to differentiate an original from a good fake?
Communicating with Issuers to validate the Credential issued by them (Current practice):
The academic institution seeks verification from the issuer through a written request.
Possibility of mail being lost.
If mail received, possibility of mail not being responded to, all issuers may not entertain the request due to varied reasons.
Issuing Institution may itself be fake.
Response to the request takes time.
The unworthy candidate is admitted to the giver institution and it may be difficult to cancel the candidature.
More profound for areas like higher education and employment.
Invoking candidature cancellation is to nobody's liking.
Time lost may result in a worthy candidate getting committed somewhere else or worse committed in an opportunity not to his/her liking.
This rejected Candidate may result in becoming a permanent failure.
The precious seat may remain vacant.

Let us note some questions that arise at this point:

Who verifies all credentials, from all institutions and that too for all levels?

If a sample is selected for full verification, who justifies the sample criteria?

Do the candidates who may have added additional qualifiers really worth that they have mentioned?

Would it be justified if a candidate maintains fake credentials during his/her tenure and accrue benefits based on them?

Does leaving out some credentials truly justify level ground for all candidates, since these credentials are not verifiable?

Is the current system to be blamed for forcing gullible candidates to fall prey to fraudsters?

This leads to the possibility of a gap being formed. The scenario becomes even scarier, with the ever increasing population, of Candidates and Issuers and the Credentials between them.

Thus the frequency of frauds will only increase and such fraud cases that go undetected will only increase. This is due to the fact that with advancements in scanning, printing and information technologies, creating an 'original' copy is commonly possible. The verification process has unfortunately not kept pace with the changing technologies.

Thus, A copy proves a copy!!.

One fake credential has the ability to get you many 'real' credentials, since majority of Credentials are based on the previous one. This makes creating an identity or copying one for convenience, not a very difficult task.

So today, if one says that I am Mr. ABC s/o DEF r/o GHI with date of birth J/K/L based on a bunch of papers, one has no option to believe it. When in reality, it was actually Mr. MNO s/o PQR r/o STU with date of birth X/Y/Z.

What to blame: Inability of Current Process or Unavailability of Correct Process?

Thus it is critical today, to immunize history for a secure future.

The invention claimed is:

1. A system for managing credential documents comprising:
a memory,
the memory comprising an electronic repository, and program instructions;
the electronic repository comprising:
a first plurality of records each representing one of a set of candidate users registered as a candidate user with the system,
a second plurality of records each representing one of a set of issuer users registered as a credential issuing institution with the system, and
a third plurality of records each representing one of set of requestor users registered as a credential requesting party with the system; and
a processor that executes the program instructions to execute communications between the electronic repository, the candidate users, the issuer users, and the requestor users;
the instructions configured such that when one of the issuer users registers with the system, the one of the issuer users selects one of a plurality of communication link options used thereafter for communications between the system and the credential issuing institution associated with the one of the issuer users for exchanging messages;

in response to a query from the system for a credential status, the associated institution issues a credential status to the system indicating if a particular credential was issued to a particular candidate of the set of candidate users by the associated institution;

in response to the associated institution issuing the credential status to the system using the message exchange the system performs a processing step comprising:
  storing the credential status in the electronic database;
  generating a unique id;
  linking the unique id to the stored credential status; and
  linking the unique id to a record of the first plurality of records representing the particular candidate;

in response to the generation of the unique id, the particular candidate may query the system to retrieve the unique id and send the retrieved unique id to one or more of the requestor registered users;

in response to receiving the retrieved unique id from the particular candidate, the one or more requestor registered users may:

log into the system;

query the system using the unique id for a verification status associated with the unique id; and and receive from the system the verification status;
wherein:
  the verification status indicates if the particular credential was issued by the associated institution and if the issued credential was issued to the particular candidate; and
  in response to the particular candidate electronically uploading the particular credential to the electronic repository, the system querying the associated institution for the credential status corresponding to the particular credential:

wherein the plurality of communication link options comprises:
  direct authentication;
  loaded data instant authentication;
  loaded data issuer guided authentication;
  asynchronous data instant authentication;
  asynchronous loaded data issuer guided authentication;
  and offline mode;

wherein when the selected communications link is direct authentication: the query by the system to the associated institution, the generation of the credential status by the associated institution, and the issuing of the credential status by the associated institution to the system, are performed without any human intervention;

wherein when the selected communications link is loaded data instant authentication: the associated institution uses the message exchange to automatically bulk load a plurality of credential status indications each including a respective credential status resulting in the system performing the processing step for each respective credential status, and in response to the query from the requestor registered user, the system immediately generates the verification status without further interaction with the associated institution;

wherein when the selected communications link is loaded data issuer guided authentication: the associated institution uses the message exchange to automatically bulk load a plurality of credential status indications each including a respective credential status resulting in the system performing the processing step for each respective credential status, and in response to the query from the requestor registered user, the system generates the verification status only after further interaction with the associated institution to confirm the credential status;

wherein when the selected communications link is asynchronous data instant authentication: the associated institution sends a plurality of credential status indications each including a respective credential status encoded onto data storage devices which must be manually bulk transferred from the data storage devices into the electronic repository thereafter resulting in the system performing the processing step for each respective credential status, and in response to the query from the requestor registered user, the system immediately generates the verification status without further interaction with the associated institution;

wherein when the selected communications link is asynchronous loaded data issuer guided authentication: the associated institution sends a plurality of credential status indications each including a respective credential status encoded onto data storage devices which must be manually bulk transferred from the data storage devices into the electronic repository thereafter resulting in the system performing the processing step for each respective credential status, and in response to the query from the requestor registered user, the system generates the verification status only after further interaction with the associated institution to confirm the credential status;

wherein when the selected communications link is offline mode: the step of querying the associated institution by the system for the credential status includes sending the query using regular postal mail, and the step of issuing the credential status to the system comprises: sending by the associated intuition a printed version of the credential status to the system; scanning the printed version of the credential status into the electronic repository of the system; determining by the system if the printed version of the credential status to the electronic repository of the system indicates whether the particular credential was issued to the particular candidate by the associated institution, recording the determination in the electronic repository, and including the determination in the verification status; and wherein when the selected communications link is not in offline mode: the step of querying the associated institution by the system for the credential status includes sending the query using electronic messages.

* * * * *